Dec. 28, 1971 J. G. E. COHN ET AL 3,631,073
PROCESS FOR OXIDATION OF CARBON MONOXIDE
Filed April 4, 1969
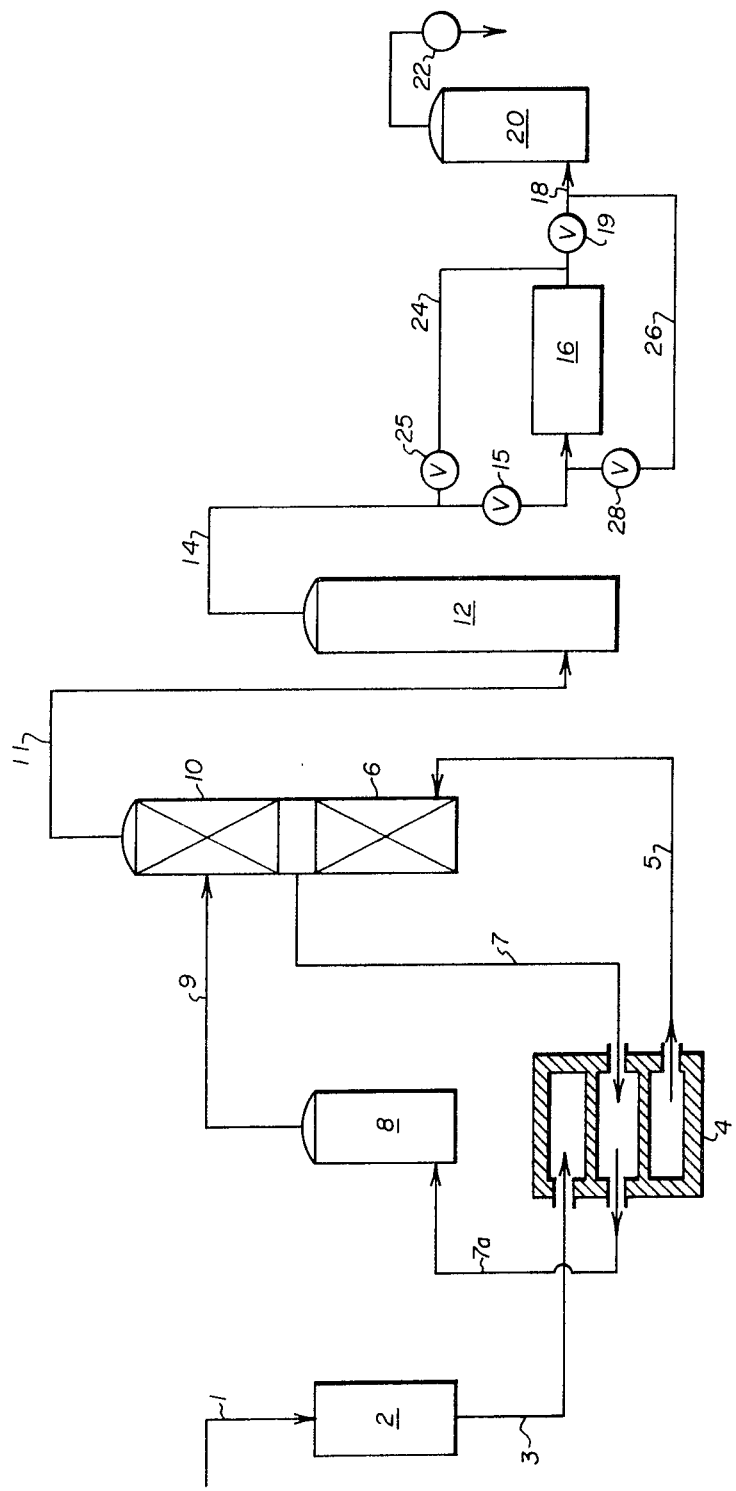

United States Patent Office 3,631,073
Patented Dec. 28, 1971

---

3,631,073
PROCESS FOR OXIDATION OF CARBON MONOXIDE
Johann G. E. Cohn, West Orange, Otto J. Adlhart, Newark, Walter Egbert, Jr., North Brunswick, and Heinrich K. Straschil, East Orange, N.J., assignors to Engelhard Minerals & Chemicals Corporation, Newark, N.J.
Filed Apr. 4, 1969, Ser. No. 813,432
Int. Cl. C01b 2/02
U.S. Cl. 252—373     1 Claim

ABSTRACT OF THE DISCLOSURE

An improved process for the selective oxidation of carbon monoxide contained in feed gases from a steam reformer-converter wherein the feed gases in admixture with oxygen are contacted with a platinum group metal catalyst and the activity of the catalyst for the selective oxidation reaction is maintained by periodically treating deactivated catalyst with the selected oxidation reaction effluent gases containing less than 50 p.p.m. carbon monoxide at a temperature of 75° to 200° C.

BACKGROUND OF THE INVENTION

This invention relates to the preferential oxidation of carbon monoxide in admixture with a hydrogen-containing gas and, more particularly, to an improvement in the process for preferential oxidation of carbon monoxide in ammonia synthesis gas.

Due to the sensitivity of the catalyst used in ammonia synthesis reactions, the process gas must be exceptionally pure and free of carbon monoxide which acts as a catalyst poison. Methods for removing the final 1 or 2 percent of carbon monoxide from ammonia synthesis gas by absorptive separation, e.g. by copper liquor or liquid nitrogen scrubbing are known, as well as methods which employ selective oxidation over a platinum group metal catalyst. In relation to the latter methods, as to which the present invention constitutes an improvement, reference may be had to U.S. Pats. 3,088,919; 3,216,782 and 3,216,783.

In the practice of the selective oxidation process, the process has been operated either at atmospheric pressure and temperatures between about 120° and 160° C., or at pressures of 100–200 p.s.i.g., and at a temperature between about 60 and 120° C. Supported platinum is the preferred catalyst, but rhodium and ruthenium are also suitable. Generally, oxygen (or air) is injected into the gas stream (effluent from the shift conversion stage) to oxidize the carbon monoxide, the oxygen to carbon monoxide ratios ranging from 1 to 3. Excess oxygen is completely consumed by conversion to water.

In the selective oxidation of carbon monoxide in a hydrogen-containing gas stream, selectivity is improved by effecting the oxidation at lower temperatures, e.g. at room temperature to about 100° C., and at pressures of atmospheric to 500 p.s.i.g. With the advent of higher pressure operation of steam reformers and of low temperature shift conversion, ammonia synthesis gas, after scrubbing of carbon dioxide, is available at pressures of 400–500 p.s.i.g. and at ambient temperature. Such a feed gas may be suitably purified of CO impurity by employing a platinum catalyst as disclosed and claimed in the aforesaid U.S. patents, or a promoted platinum metals catalyst as disclosed in co-pending U.S. patent application Ser. No. 509,192, filed Nov. 22, 1965, now abandoned. It has been found, however, that when the selective oxidation is effected at low initiation temperatures, e.g. from about 20° C. to 100° C., the platinum metals catalyst gradually becomes deactivated resulting in poor CO oxidation after a period of on-stream operation.

SUMMARY OF THE INVENTION

In accordance with the present invention, carbon monoxide impurity contained in ammonia synthesis feed gas is selectively oxidized by contacting the feed gas and added oxygen with a platinum group metal catalyst at an initial reaction temperature of from about 20° C. to about 100° C., resulting in an outlet temperature from the catalytic reactor due to the selective oxidation of the contained carbon monoxide of from about 75° C. to about 200° C., and periodically treating the deactivated catalyst with the effluent of the selective oxidation process containing less than 50 p.p.m. by volume of carbon monoxide, at a temperature of about 75° C. to about 200° C. to restore the catalytic activity thereof. Such treatment of the catalyst for reactivation thereof can be achieved by storing effluent gas from the selective oxidation reaction for subsequent treatment of the catalyst bed when desired, or by periodically reversing the flow of the gas stream to the catalytic reactor when the efficiency of the catalyst for selective oxidation falls off. In a preferred embodiment of the invention, feed gas flow to the catalyst is reversed before the carbon monoxide content of the effluent gases exceeds 10 p.p.m. by volume.

The accompanying drawing is a flow diagram depicting a single stage process utilizing a supported platinum catalyst for converting carbon monoxide to carbon dioxide in a gaseous mixture which is to be used for ammonia synthesis.

Referring to the figure, a mixture of steam, air and natural gas is fed from source not shown by inlet line 1 through reformer furnace 2, the mixture passing through tubes which are exteriorly heated. Reforming takes place at a temperature of about 1600° F. and results in formation of a reformer effluent gas containing hydrogen, carbon monoxide and carbon dioxide. A small amount of hydrocarbon, e.g. methane also remains in the gas. Any nitrogen which entered with the air remains in the gas. The effluent gases pass by line 3 from the reformer furnace and are heat exchanged in a heat exchanger 4, then passed by line 5 to a saturator 6 in which the gases are saturated with water vapor. From the saturator, the gases are passed by line 7 to heat exchanger 4 and thence by line 7a to a carbon monoxide converter or shift converter 8 in which carbon monoxide is reacted with water vapor to produce carbon dioxide and hydrogen. The effluent gasses from the carbon monoxide converter leave converter 8 by line 9 are then cooled by contact with water in the heater tower 10.

The effluent gases from the heater tower 10 are then passed by line 11 through an absorber 12 in which the carbon dioxide in the gases is absorbed by monoethanolamine. Effluent from the absorber 12 normally at a pressure of 200–500 p.s.i.g. and at a temperature of 20–100° C. and typically containing, as impurities 0.1% $CO_2$; 0.5% CO; 0.4% methane and 0.3% argon, passes by line 14 and valve 15 to catalytic unit 16 containing a supported platinum metal catalyst. Air is added to the catalytic unit 16 by lines not shown to give the desired oxygen to carbon monoxide ratio and, as the admixture of gases passes through the catalytic unit, carbon monoxide is oxidized to carbon dioxide and a small amount of hydrogen combines with excess oxygen to form water. The effluent gases from the catalytic unit 16 may be optionally cooled, and are then passed by line 18 having valve 19 to the secondary absorber 20 in which carbon dioxide in the gases is absorbed by monoethanolamine. After passing through the gas cooler 22, the gases may be passed directly to the ammonia synthesis process. Normally the catalytic oxidation provides a purified gas stream containing less than about 10 p.p.m. carbon monoxide.

Catalytic unit 16 is provided with reverse flow line 24 having valve 25 and line 26 having valve 28. During the course of the catalytic oxidation in oxidator 16, which is effected at an inlet temperature of about 20 to 100° C., and at an outlet temperature of 75°–200° C. (due to the exothermic heat of the oxidation reaction), the catalyst gradually becomes deactivated and, after a period of time, the effluent gases from the catalytic unit show a sharp increase in the amount of unconverted carbon monoxide, for example from about 10 p.p.m. to 50 p.p.m. or higher. When this occurs, valves 15 and 19 are closed, and the flow of gases from absorber 12 passed by line 14 is reversed in the oxidation unit 16 and passed through valve 25 and line 24 through oxidation unit 16 in direction opposed to that initially employed. Valve 28 now being open, the oxidation reactor effluent passes by line 26 and line 18 to secondary absorber 20. The increased temperature of the oxidation reactor effluent, during this period of reverse flow, desorbs and/or removes impurities which are deposited on the catalyst in reactor 16 during flow in the normal direction. Periodically, and after the effectiveness of the catalytic reaction declines, as shown by CO breakthrough in the oxidation reactor effluent, valves 25 and 28 are closed, valves 15 and 19 opened, and normal flow through the oxidation reactor is resumed.

The inlet gas which is treated in accordance with the present invention may contain, on a dry basis and before the addition of oxygen or air, from about 0.01 to about 3% by volume of carbon monoxide, from 0 to about 5% carbon dioxide, from about 50 to about 99% hydrogen, and from 0 to 50% by volume of nitrogen. Typical gas mixtures contain 0.5%–3% CO, 50–75% $H_2$, 15–40% $N_2$ and 0–5% $CO_2$. Where the gas is to be used for ammonia synthesis, the ratio of hydrogen to nitrogen will be approximately 3 to 1.

The temperature in the catalytic unit containing the platinum group metal catalyst will generally be from about 20° to 100° C. at the gas inlet, and from about 75° to 200° C. at the outlet. Catalytic oxidation of contained carbon monoxide may result, where the carbon monoxide is contained in amounts above about 1% in the gas to be treated, in unduly high temperature increases due to the exothermic nature of the oxidation reaction. In such case, more than one catalytic reactor may be employed in series if desired with intermediate cooling of the partially oxidized gas.

Generally, the catalytic oxidation reaction is effected at a pressure of atmospheric—500 p.s.i.g., and at a space velocity of the gases passed over the oxidation catalyst of about 1000 to 50,000 cubic feet of gas per hour per cubic foot of catalyst, preferably 5,000 to 30,000 cubic feet per hour per cubic foot of catalyst. Sufficient oxygen or air is added to the gaseous mixture to provide an oxygen to carbon monoxide ratio, by volume, in the range of about 0.5:1 to 3:1, preferably about 0.75 to 1 on a dry basis. The catalyst used is a platinum group metal including platinum, rhodium and ruthenium on a suitable support, and suitable catalyst supports include alumina, silica, silica gel, diatomaceous earth, clay and the like. The catalyst metal may be present in the range of about 0.01 to 5% by weight of the catalytic metal and support, preferably about 0.05 to 2%. The supported catalyst may be prepared in any suitable manner, i.e. by treating the carrier or support with a solution of a suitable metal compound and then reducing the metal compound to metal.

A particularly effective catalyst which can be employed for catalytic oxidation of carbon monoxide, and which permits initiation of the oxidation reaction at low temperatures, e.g. at ambient temperature and at low oxygen:carbon monoxide ratios, consists of a supported platinum catalyst promoted with minor effective amounts of an oxide of a metal selected from the group consisting of manganese, iron, cobalt, nickel and mixtures thereof. The utilization of such catalysts is disclosed in U.S. Ser. No. 509,192, filed Nov. 22, 1965, now abandoned.

By means of the process of the present invention, carbon monoxide content of hydrogen-containing gases, e.g. such as are to be employed in ammonia synthesis, can be readily reduced to less than 10 p.p.m. and after removal of carbon dioxide formed by the process, such purified gas streams are suitable for use in ammonia synthesis without adverse effect on the synthesis catalyst. By employing the process of the present invention, continuous and sustained activity of the oxidation catalyst is achieved without loss due to down-time in replacement of spent catalyst, or interruption of regeneration gases such as hot air as taught in U.S. Pat. 3,088,919.

The invention will be further illustrated by reference to the following specific examples:

Example 1

A cylindrical stainless steel reactor of ½ inch diameter was provided with means for reversing the direction of the flow of feed gas through the reactor and with means for sampling the gas at either end of the reactor. The reactor was charged with 50 ml. of a catalyst consisting of 0.3 wt. percent Pt and 0.05 % Fe on ⅛" alumina cylinders.

The feed gas which was used had the following composition:

| | Percent |
|---|---|
| $CO_2$ | 0.1 |
| $CO$ | 0.5 |
| $O_2$ | 0.37 |
| $N_2$ | 4.0 |
| $H_2$ | Balance |

The feed gas was introduced to the catalytic reactor at a pressure of 200 p.s.i.g. and a space velocity of 10,000 hr.$^{-1}$, the temperature at the inlet being at ambient temperature (20° C.). Outlet gas temperature was about 75° C. When the effluent from the oxidation reactor showed, by analysis, breakthrough of carbon-monoxide, the direction of the feed gas flow was reversed. This procedure was performed periodically as required. The results of gas flow reversal are shown in the table below:

TABLE

| Comments | Running time (hrs.) | Effluent CO (p.p.m.) |
|---|---|---|
| Gas flow started | 24 | <2 |
| | 336 | <2 |
| | 480 | <2 |
| | 525 | 26 |
| Gas flow reversed | 648 | <2 |
| | 816 | 500 |
| Gas flow reversed | 864 | 2 |
| | 985 | 50 |
| Gas flow reversed | 1,015 | 30 |
| Do | 1,045 | 30 |
| Run terminated. | | |

As can be seen the life of the catalyst was increased by reversing the direction of the flow of feed gas.

Example 2

The procedure described in the example above was followed except that the gas flow was reversed every 24 hours even though the effluent did not indicate any lessening in activity by CO breakthrough. The results are given in the table below:

TABLE.—GAS FLOW REVERSED DAILY

| Running time (hrs.) | Effluent CO (p.p.m.) |
|---|---|
| 24 | <2 |
| 360 | <2 |
| 480 | <2 |
| 600 | <2 |
| 960 | <2 |
| 1320 | <2 |
| 1680 | <2 |
| 2040 | <2 |
| 2400 | <2 |
| 2760 | <2 |
| 3120 | <2 |
| 3570 | <2 |

Still running.

As can be seen from this example reversal of the feed flow prior to any CO breakthrough is particularly beneficial in extending the life of the oxidation catalyst.

What is claimed is:

1. In a process for the selective oxidation of carbon monoxide in a feed gas comprising from about 0.01 to about 3 volume percent carbon monoxide from about 50 to about 99% hydrogen, from 0 to about 5% carbon dioxide and the remainder inert gas wherein said feed gas in admixture with oxygen in an amount to provide a mol ratio of between about .5:1 and 3:1 mols oxygen per mol carbon monoxide is contacted with a supported platinum group metal catalyst at a pressure of atmospheric—500 p.s.i.g. and an inlet temperature between about 20° and 100° C., and wherein the catalyst becomes progressively deactivated for the selective oxidation reaction, the improvement which comprises periodically treating the deactivated catalyst with effluent gases from the selective oxidation reaction containing less than 50 p.p.m. by volume of carbon monoxide at a temperature of from about 75° C. to about 200° C. thereby restoring the catalytic activity of the catalyst.

References Cited

UNITED STATES PATENTS 3,088,919  5/1963  Brown, Jr., et al. _____ 252—373

LEON ZITVER, Primary Examiner

A. M. SIEGEL, Assistant Examiner

U.S. Cl. X.R.

23—213; 252—376